United States Patent [19]
Dautriche

[11] Patent Number: 5,432,348
[45] Date of Patent: Jul. 11, 1995

[54] THERMAL IMAGE DETECTOR WITH FAST SHUTTER PERIOD, AND METHOD OF OPERATION

[75] Inventor: Pierre Dautriche, Claix, France

[73] Assignee: Thomson-CSF Semiconducteurs Specifiques, Paris, France

[21] Appl. No.: 174,404

[22] Filed: Dec. 28, 1993

[30] Foreign Application Priority Data

Dec. 30, 1992 [FR] France .................. 92 15907

[51] Int. Cl.⁶ ............................................. G01J 5/62
[52] U.S. Cl. ................................. 250/330; 250/338.3
[58] Field of Search ............ 250/330, 338.3, 338.1, 250/338.4, 333

[56] References Cited

U.S. PATENT DOCUMENTS

| | | | |
|---|---|---|---|
| 3,849,651 | 11/1974 | Ennulat | 250/349 |
| 3,979,604 | 9/1976 | Bate | 250/370.08 |
| 4,072,863 | 2/1978 | Roundy | . |
| 5,262,647 | 11/1993 | Kumada | 250/338.3 |
| 5,283,438 | 2/1994 | Dautriche | 250/338.3 |

FOREIGN PATENT DOCUMENTS 0435773 7/1991 European Pat. Off. .
2-185174 7/1990 Japan .

*Primary Examiner*—Paul M. Dzierzynski
*Attorney, Agent, or Firm*—Oblon, Spivak, McClelland, Maier, & Neustadt

[57] ABSTRACT

The disclosure relates to thermal image detectors and, more particularly, to linear or matrix type pyroelectic detectors. These detectors work differentially, in successive phases of masking and illumination, by use of a shutter that is synchronized with the signal processing circuits. The detected signals are shed in the form of charge packets into a shift register (RD). To reduce the noises that are proportional to the duration of the illumination or masking phases, the shutter is made to work at higher speed and several successive illumination/masking cycles are carried out by making the shift register go backward between two cycles. The shift register is emptied to give an image signal only after two or more cycles.

5 Claims, 5 Drawing Sheets

THERMAL IMAGE DETECTOR WITH FAST SHUTTER PERIOD, AND METHOD OF OPERATION

BACKGROUND OF THE INVENTION

1. Field of the Invention

The invention relates to thermal image detectors, notably pyroelectric detectors, designed to produce an image of a scene in infrared light, and especially to detectors that work at ambient temperature.

Pyroelectric detectors absorb infrared radiation to heat a pyroelectric layer, namely a layer with the property of generating surface charges as a function of the temperature. The charges generated, converted into voltage, are processed to give a measurement of the intensity of infrared radiation received by the detector. There may be other types of infrared image detectors relying on effects other than the pyroelectric effect but relying also on the heating of a layer. These other types are also concerned by the invention which, however, shall be described in detail solely with reference to a pyroelectric detector.

The detector may be a point detector, or it may comprise a column of pyrosensitive points to make an infrared linear image, or again it may be a matrix network of points to form a 2D image. In particular, this image may be an image of the temperature distributions of an observed scene.

There are hybrid detectors using two substrates: one substrate that fulfils the pyroelectric function and one substrate that fulfils the signal processing functions. The two substrates are bonded face to face to connect each pyrosensitive point of the first substrate to a point of the second substrate.

More recently, monolithic detectors have also been proposed. These monolithic detectors are constituted by an integrated circuit substrate covered with pyroelectric material (a pyroelectric polymer material) that can be deposited in a thin layer. The substrate bears the circuit elements needed for the processing of the pyroelectric signal that is generated.

2. Description of the Prior Art

Since the pyroelectric material produces charges proportionally to its heating, and since this heating is an integral of the intensity of radiation received, the pyroelectric detector must work differentially and not absolutely, especially if fixed scenes are to be observed. Indeed, a constant intensity of radiation, representing the luminance of a point emitting an infrared radiation, will prompt a gradual heating of the material up to a saturation value that cannot be used to deduce the intensity of the radiation received. Furthermore, an absolute measurement of temperature would depend excessively on the variations in ambient temperature of the detector and would not be sufficiently representative of the temperature distributions of the scene observed.

This is why, it is provided that the detector will be alternately illuminated, i.e. subjected to infrared radiation, and then masked. The period of the illumination/masking alternation should be sufficient to give the pyroelectric material the time to be heated during the illumination and the time to be cooled during the masking. The period is equal, to, for example 1 to 50 Hertz (10 milliseconds of illumination for 10 milliseconds of masking). What is measured then is not the mean heating but the amplitude of variation of the heating during the alternation. This amplitude represents the intensity received, and works much better than the mean heating, which depends on too many other parameters.

The curve of FIG. 1 shows the evolution of the temperature of the pyroelectric layer when the illumination is thus alternated. The curve is expressed directly in terms of voltage as a function of time, the voltage indicated being a fictitious voltage that represents an output signal of the detector, it being assumed that this signal is proportional to the heating of the pyroelectric material.

The temperature rises at the start of an illumination phase and tends towards a high saturation value that depends not only on the infrared intensity received but also on the heat losses of the pyroelectric layer. Then, it falls again as soon as the masking phase starts and tends also towards a low saturation value, with a speed that depends also on the thermal losses. The difference between the voltage at the end of the illumination phase and the voltage at the end of the masking phase gives a good measurement of the intensity of the infrared radiation received.

The detection consists then, broadly speaking, in measuring a sample of a signal VSH at the end of an illumination phase and a sample of a signal VSB at the end of a masking phase, and in taking the difference VSH-VSB, to deduce therefrom a value of infrared intensity received.

It will be understood that the period of the illumination/masking alternation should be such that the pyroelectric layer has enough time to be heated and cooled at each phase, so that the variations of charges generated are sufficient in amplitude. If the duration of each phase is too short, then the signal-to-noise ratio is too small, the noise considered here being a noise that is independent of the duration of the phase. If it is too long, the gain in terms of signal level is no longer improved owing to the saturation of the signal curve (see FIG. 1). Furthermore, for reasons of compatibility with standard imaging systems, it is sought to put out an image at a frequency of 25 to 60 Hz.

These reasons most usually mean that the shutter has to be made to work at a frequency that corresponds precisely to the output frequency of the images (25, 30, 50 or 60 Hz) for which the signal level obtained is sufficient without being excessively close to saturation.

However, it has been observed that certain structures of pyroelectric detectors are sensitive to a noise whose amplitude is proportional to the duration of the integration. Without going into every case where this is possible, it may be pointed out, by way of an example, that this is the case in a monolithic detector structure wherein each pixel is defined by a is pyroelectric capacitor and wherein the capacitor connected to a semiconductor substrate by means of a reverse-biased diode. The natural thermal generation of the charge carriers in this diode disturbs the pyroelectric charge generated by the observed image. And this disturbance is proportional to the duration of each phase, a resetting-to-level operation being done at the end of each phase to prevent a permanent drift.

It can be the case that this noise is not negligible for the durations of phases considered here above.

The invention proposes a method to increase the signal-to-noise ratio of the thermal detectors.

SUMMARY OF THE INVENTION

According to the invention, there is proposed a thermal image detector comprising at least one column of pyrosensitive points, each point connected to a respective stage of a shift register in order to shed therein charges whose quantity depends on the temperature of each point, a shutter to illuminate and mask the detector alternately, a means to provide the register cyclically with at least one measurement signal of a point illuminated during an illumination phase and at least one measurement signal of a point masked during a masking phase, wherein there is provision for a means to make the contents of the register go forward between the measurement shedding operations of a cycle comprising at least one illumination phase and one masking phase, a means to make the contents of the register go backward before the measurement shedding operations of the next cycle and means to make these contents go forward again between the shedding operations of this following cycle, and means to empty the register after the performance of a group of at least two successive cycles to give an image signal.

The operating method of the detector therefore consists in:

a) making measurements during a first cycle comprising an alternation of illumination and masking phases, and shedding the results of the measurements into successive stages of a shift register, in making the register go forward by one step after a shedding and before the shedding of a following measurement of this cycle;

b) making the contents of the register go backward by a number of steps related to the number of forward steps in the cycle (generally, the number of steps backward will be the same as the number of steps forward);

c) making measurements during a second cycle comprising an alternation of illumination and masking phases, shedding the results of the measurements into the stages of the shift register in making the shift register go forward again by one step after a shedding and before the next shedding in the same cycle;

d) and, finally, emptying all the contents of the register to give an image signal after the performance of at least two successive cycles.

The group of steps b) and c) may be repeated several times. This means that the register is emptied only after a series of three, four or more cycles.

The signal level is increased by the successive addition of measurements in the same zones or compartments of the shift register. The operating speed of the shutter (and hence the periodicity of the measurements made) may be greatly increased. However, the output frequency of the final image signal may remain constant (50 Hz for example for a shutter periodicity of 100 Hz or even 150 or 200 Hz). The noise proportional to the duration of the illumination and masking phases is very greatly reduced since this duration is divided by 2, 3 or 4.

In practice, the operation is not limited to just one measurement during a stage but what is done in fact is rather a measurement at the start of a phase, for example after a resetting-to-level step, and an end-of-phase measurement. In this case, the register goes forward by three steps during a cycle, and it will have to go back by three steps before the next cycle.

The output signal of the detector will be prepared on the basis of a twofold difference: a first differential signal represents the difference between the measurements made at the start and end of an illumination phase and cumulated by the register on at least two successive cycles; a second differential signal represents the difference between the measurements made at the start and end of a masking phase, also cumulated over two cycles. Then, a result signal is prepared on the basis of the difference between the two differential signals. It is this signal that represents the temperature or intensity of the infrared emission of a point of a scene projected and focused on the detector.

The invention can be applied very particularly to monolithic detectors wherein the charges generated by pyroelectric effect are used to control the level of a potential barrier in a charge-coupled device (CCD, or charge-transfer device, but wherein there is provided a diode between the substrate of this device and the capacitor.

BRIEF DESCRIPTION OF THE DRAWINGS

Other features and advantages of the invention will appear from the following detailed description made with reference to the appended drawings, of which.

MORE DETAILED DESCRIPTION

Figure 2:
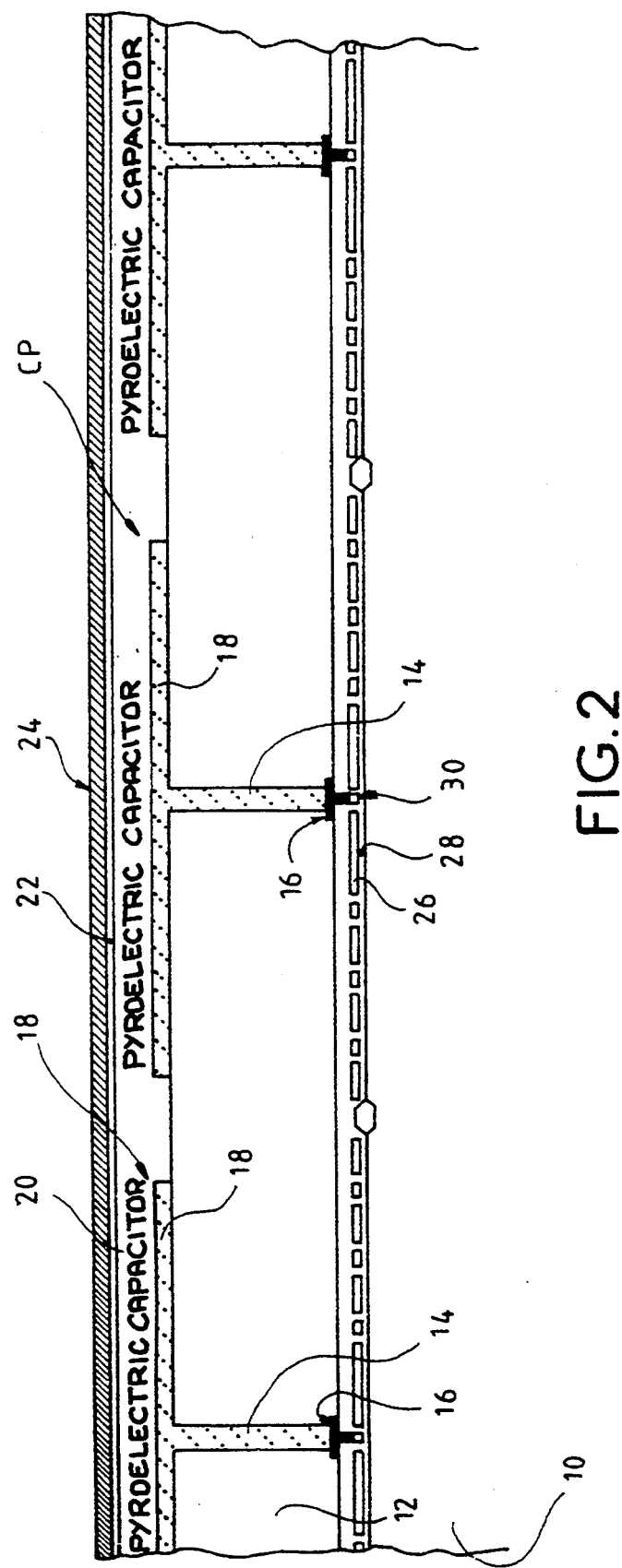
FIG. 2 shows the general structure of a monolithic pyroelectric detector comprising charge-transfer type processing devices.

Reference shall be made to the present Applicant's patent FR 90/15476 for a detailed understanding of the structure and working of a monolithic, pyroelectric matrix detector. As a rule, as shown in FIG. 2, the detector has a monolithic silicon substrate 10 in which there is formed an integrated circuit essentially comprising charge-coupled devices or charge-transfer devices and the associated control circuits. The charge-transfer devices are essentially shift registers with charge transfers by parallel columns. The devices have means for the injection, into the zones or compartments of the register, of quantities of charges related to the infrared illumination to be measured, i.e. generally related to the temperature of each pixel of the infrared image observed. The control circuits are circuits that enable, firstly, the injection of charges into the registers and, secondly, the periodic shifts of packets of charges along the registers and, finally, the reading of these charges, namely the conversion of the packets of charges into voltages. The semiconductor substrate 10 is covered with an electrical and thermal insulator 12, made of polyimide for example. This insulator is pierced locally with apertures that are filled with conductive material to constitute conductive vias 14 between the top and the bottom of the thermal insulator layer. Beneath this layer, each of the vias is in contact with a respective conductor 16 of the underlying integrated circuit. Individual rectangular electrodes 18 are deposited above the thermally insulating layer 12 in a matrix network occupying the major part of the surface of the detector. Each electrode 18 defines a pixel to be observed and it is connected to a respective conductive via 14, hence to a respective conductor 16 of the semiconductor substrate. The thermal insulator layer, thus coated with electrodes connected to the integrated circuit, is covered with a pyroelectric layer 20, preferably a layer of pyroelectric polymer material with low thermal conductivity. Finally, a conductive layer 22 is deposited on the surface of the pyroelectric layer, and a layer 24 that absorbs the infrared rays in the desired range of wavelengths (generally 8 to 14 micrometers) is deposited on the conductive layer 22. The layers 22 and 24 may be one and the same layer.

Each electrode 18, with the portion of pyroelectric layer that covers it, defines a pyroelectric capacitor CP having an individual lower plate 18 and a collective upper plate 22. This capacitor gets charged as a function of its temperature and is connected to the underlying integrated circuit with a view to the creation, in the integrated circuit, of an electrical signal resulting from this charge.

The underlying integrated circuit is a charge-transfer circuit, and this circuit is symbolized by juxtaposed electrodes 26, generally made of polycrystalline silicon. These electrodes are insulated by a thin insulating layer 28 from the semiconductor substrate 10 in which electrical charges flow. The conductor 16, connected to a conductive via 14 of a respective capacitor, may be electrically connected to one of these electrodes, designated by 30 in FIG. 2. This electrode acts as a potential barrier with variable height for the charges that flow in the substrate, so that packets of charges can be modulated as a function of the charge of each pyroelectric capacitor. The modulated charges are transferred into shift registers that then shift these charges in parallel to the columns of capacitors of the network, i.e. in a direction perpendicular to the plane of FIG. 2.

Figure 4:
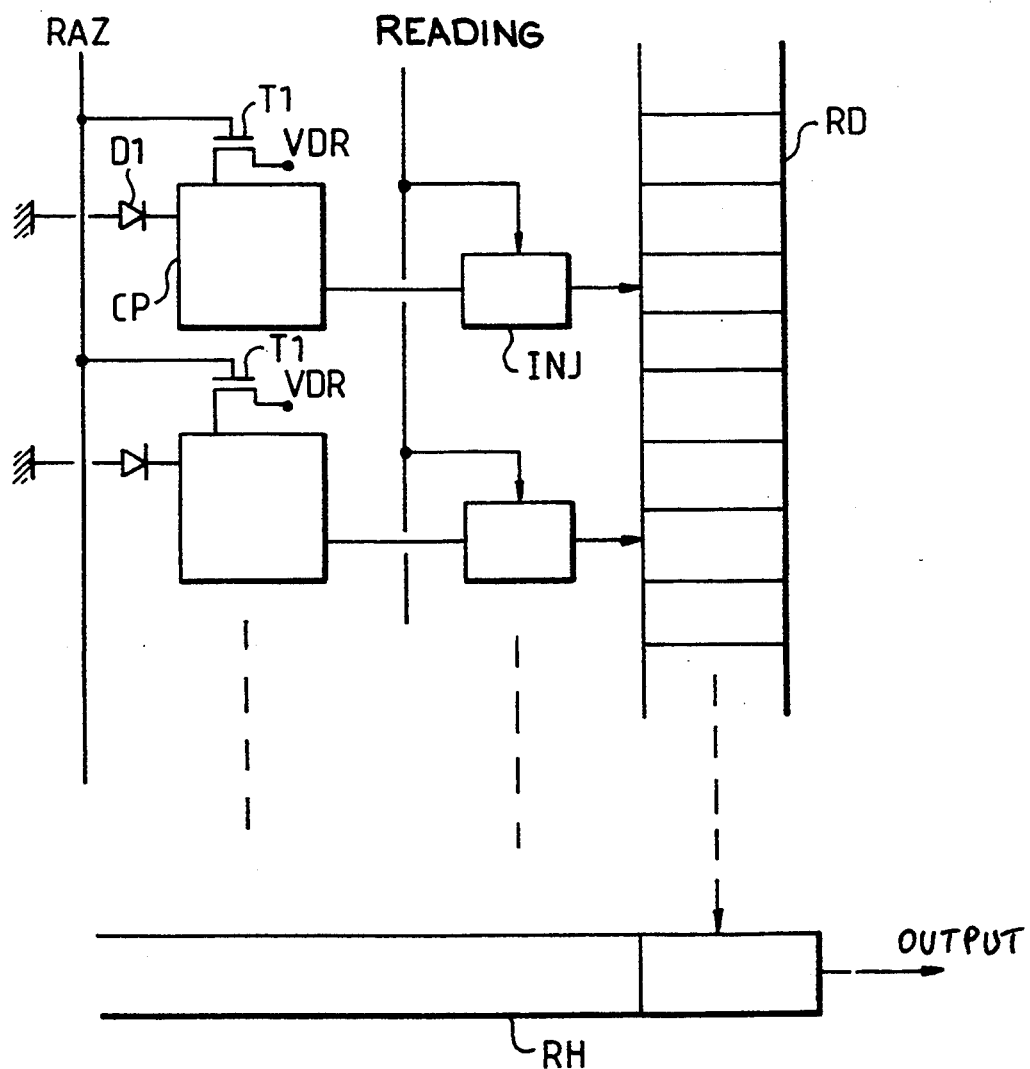
FIG. 4 shows the organization of the detector with pyroelectric capacitors and means of injection into a charge-transfer register.

Preferably, although this cannot be seen in FIG. 2, the conductor 16 connected to the lower plate 18 of the capacitor is connected to an N+ type diffused zone forming, with the substrate, a PN junction that is reverse biased in normal operation (diode D1 in FIG. 4). Furthermore, since this diode generates a noise of charges by thermal effect, a an external transistor T1 (FIG. 4) for the periodic resetting to level of the plate 18 voltage is provided for. The resetting-to-level is done in synchronism with the working of the shutter. Details on this point are given in the above-mentioned patent No. FR 90 15476.

In other embodiments of charge-transfer devices, the pyroelectric capacitors are connected directly to the substrate for a direct injection of pyroelectric charges into the semiconductor. In other embodiments that use no charge-transfer devices, the pyroelectric capacitors are connected to circuits for the direct measurement of the voltage at the terminals of these capacitors.

The detector thus made will generally be placed behind an optical element that forms an infrared image of an observed scene on the surface of the detector. A germanium lens is appropriate for wavelengths of the order of 10 micrometers. A periodically activated shutter is placed between the scene to be observed and the detector, in principle between the lens and the detector.

The absorbent layer receives the infrared radiation with an intensity that depends locally on the observed scene. It therefore gets heated locally according to a pattern of temperatures that corresponds to the observed image. The pyroelectric capacitors get heated accordingly, as a function of this image, and define pixels that reproduce the pattern of temperatures of the absorbent layer with a resolution defined by the number of capacitors of the matrix network.

Each capacitor generates surface charges as a function of its own mean temperature so that, at a given instant, a given capacitor possesses a charge of its own that represents the influence, at this point and at this instant, of the infrared radiation received by the detector.

As has been explained here above, the infrared image detection makes it necessary to carry out a differential measurement between the charge resulting from the illumination and the charge in darkness. The shutter placed before the detector makes it possible to carry out this differential measurement. The shutter may be mechanical (an optical plate passing periodically before the detector, or an oscillating mirror) or electro-optical (for example a liquid crystal cell).

Figure 1:
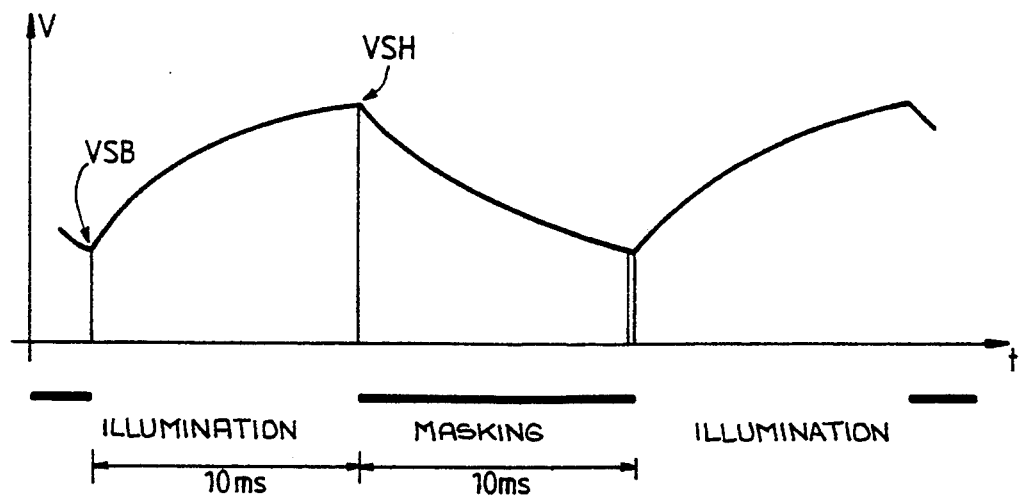
FIG. 1, already described, is a timing diagram explaining the form of the temperature variations generated in the pyroelectric layer of a detector with shutter operation.

It may be assumed that the pyroelectric charge generated in a pyroelectric capacitor is represented by a voltage, either because this voltage is the voltage directly measured at the terminals of the capacitor or a voltage deduced from this voltage, or because the voltage is the result of a conversion of a packet of pyroelectric charges injected by the capacitor into the substrate or again because it is the result of the conversion of a packet of charges modulated by the voltage at the terminals of the pyroelectric capacitor. In any case, the form taken by the variations of the voltage representing the pyroelectric charge is then the one explained with reference to FIG. 1.

The principle of the measurement for a pyrosensitive point then consists in determining the voltage VSB at the end of a masking phase, then the voltage VSH at the end of an illumination phase. The difference VSH-VHB is obtained. This difference is a signal representing the infrared radiation at this point. The quality of the measurement, and especially the signal-to-noise ratio, is improved by carrying out two successive measurements for one and the same masking and illumination cycle. A measurement is made of the difference in voltage generated between the start and the end of the illumination, and then of the difference in voltage generated between the start of the masking phase and the end of the masking phase, and then the difference between these two measurements is taken.

Figure 3:
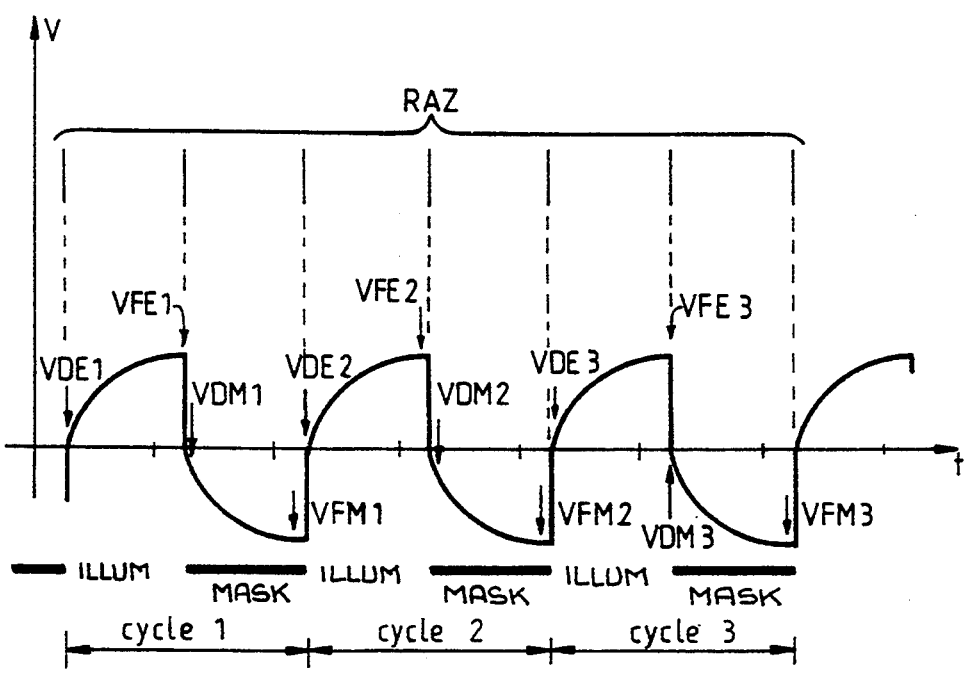
FIG. 3 shows the form of the voltage variations at the terminals of the pyroelectric capacitor in a detector according to the invention, with periodic resetting to level.

This principle is applied especially when the voltage of the lower plate of the pyroelectric capacitor is reset at the end of each phase (to prevent the drifts that are caused, for example, by the thermal generation of charge carriers in the diode D1 connected between the pyroelectric capacitor and the substrate, this diode being used for the initial polarization of the pyroelectric material: see the above-mentioned patent application No. 90 15476). In this case, the evolution of the voltage at the terminals of the pyroelectric capacitor is more likely to be the one shown in FIG. 3. The measurement of temperature at a point consists again in determining the difference in voltage generated between the start and the end of the illumination phase and, preferably, also the difference generated between the start and the end of the masking phase, and it is also possible to take the difference between these two measurements. For example, a measurement is made of the voltage VDE1 at the start of the illumination phase, just after a voltage resetting (RAZ), then of the voltage VFE1 at the end of the illumination phase. Then a resetting is done. A measurement is made of the voltage VDM1 at the start of the masking phase just after this resetting and of the voltage VFM1 at the end of the masking phase. A voltage resetting is done again, etc. The useful signal is obtained by the difference VFE1-VDE1 or VFM1-VDM1 or, better still, by (VFE1-VDE1)-(VFM1-VDM1).

At the next cycle, the following measurements are made: Cycle 2: VDE2, VFE2, VDM2, VFM2 Cycle 3: VDE3, VFE3, VDM3, VFM3

The voltage resetting operations (RAZ) are done in synchronism with the changes in phase of the shutter.

The time interval between the measurement and the resetting is very small compared with the duration of the phase: there is, for example, an interval of some microseconds between a measurement and a resetting for an illumination or masking phase that lasts three milliseconds.

The four measurements corresponding to a cycle may be stored in four adjacent compartments of a shift register.

FIG. 4 shows a schematic view of the organization of the shift register RD associated with a column of pyroelectric capacitors CP. The number of compartments of the register is four times greater than the number of capacitors. The lower plates of the capacitors are reset to level regularly by the transistors T1 connected to a source of resetting-to-level voltage VDR. An injector of charges INJ, controlled by the potential of the pyroelectric capacitor, is activated simultaneously for all the capacitors. The injector injects a quantity of charges proportional to the measurement signals VDE1, VFE1 etc. into the register. The register is offset in synchronism with the different measurements, hence with the different instants of injection. The diode D1, between the capacitor and the substrate, is the one that is used for the initial polarization of the pyroelectric layer and tends to generate noise that is an inconvenience in normal use.

Four injection operations succeed one another for each cycle: these are the injection of a signal representing VDE1, the shifting of a compartment of the register; the injection of a signal corresponding to VFE1; the resetting to level and shifting of a compartment of the register; the injection of VDM1; the shifting of a compartment; the injection of VFM1; resetting to level.

In the prior art, after the end of the cycle, the columnwise register columnwise to obtain an image signal (in a standard way, the last section of each of the columnwise registers gets emptied into a respective compartment of a horizontal register RH; this operation is repeated four times; then the horizontal register is emptied very quickly after each series of four steps of shifting of the columnwise registers).

In fact, in the prior art, the cycles are slightly offset with respect to what has just been stated. To have the time to empty the register during the first phase of the next cycle, without losing the measurements of this next cycle, the following successive measurements are chosen: Cycle 1: VFE1, VDM1, VFM1, VDE2; Cycle 2: VFE2, VDM2, VFM2, VDE3, etc...

According to the invention, the working frequency of the shutter will be increased, thus reducing the duration of each phase while at the same time continuing to produce image signals with the same periodicity.

Figure 5:
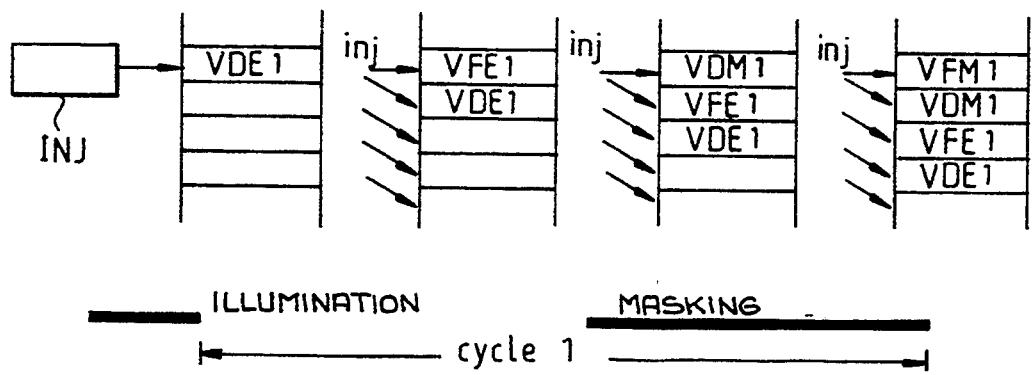
FIGS. 5 to 8 show the successive steps of operation of the shift register.

During a first cycle comprising an alternation of masking and illumination phases, the measurements made during this cycle are shed successively into the register RD by the injector INJ. In the simplest version, the cycle begins at the start of the illumination phase and ends at the end of the following masking phase, and the measurements VDE1, VFE1, VDM1, VFM1 are stored successively during this cycle, in making the contents of the register advance by one step after each step, giving three steps in all. FIG. 5 shows the gradual filling of the register that results therefrom. Only four compartments of the register are considered. The four following or preceding compartments correspond not to the same pixel but to the adjacent points of the same column.

Figure 6:
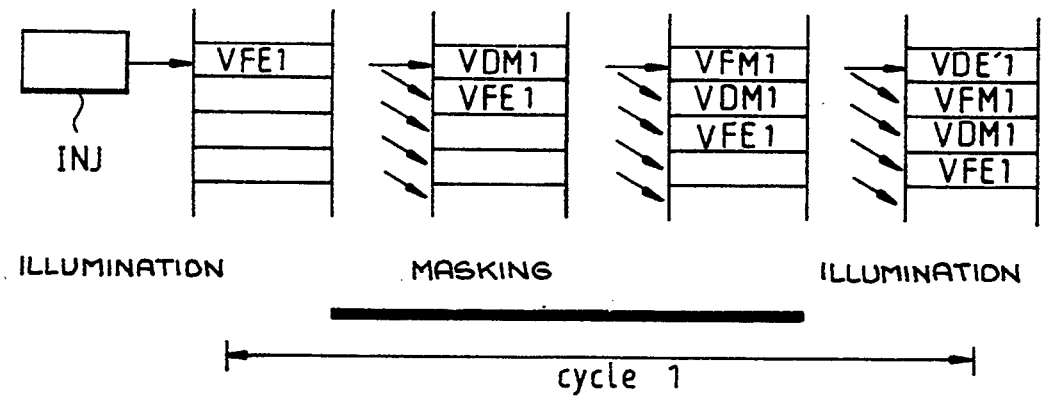

It will be noted that the cycle could begin just before the end of an illumination or masking phase, for example just after the shedding of VFE1. In this case the cycle (like the following cycles) would comprise the following alternation: end of the illumination phase, complete masking phase, major part of the new illumination phase. This case is shown in FIG. 6.

After the end of the first cycle, the contents of the register RD are made to go backward swiftly by three steps before the shedding of the measurements corresponding to the next cycle. It will be observed that if there is not enough time available to push back the contents of the register by three steps between the shedding of VFM1 and the shedding of VDE2, it is necessary to adopt the cyclical structure of FIG. 6 rather than that of FIG. 5.

Figure 7:
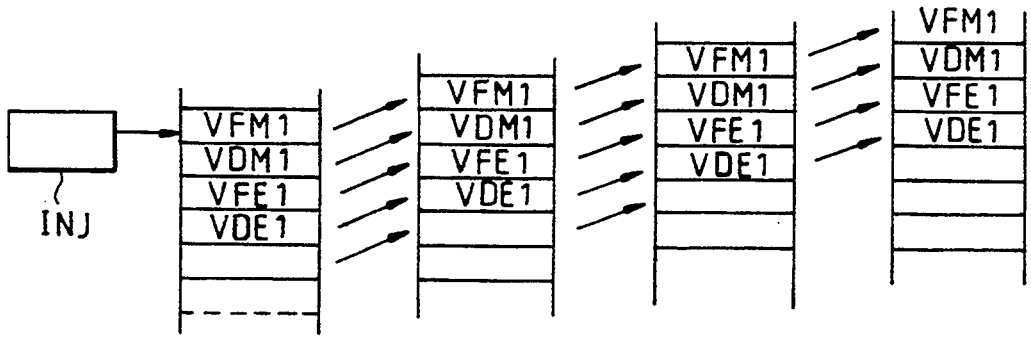

The contents of the register during this phase of going backward is shown in FIG. 7. The initial contents are those that correspond to the last phase of FIG. 5. The final contents are such that the charge corresponding to the measurement VDE is now in the register compartment located so as to be facing the injection device INJ.

The second cycle of measurements is then carried out: this cycle comprises the injection of a charge corresponding to a new measurement VDE2 at the start of the illumination, the moving forward of the register by one step, a second measurement VFE2, moving forward by one step, a third measurement VDM2, moving forward by one step, and last measurement VFM2.

Figure 8:
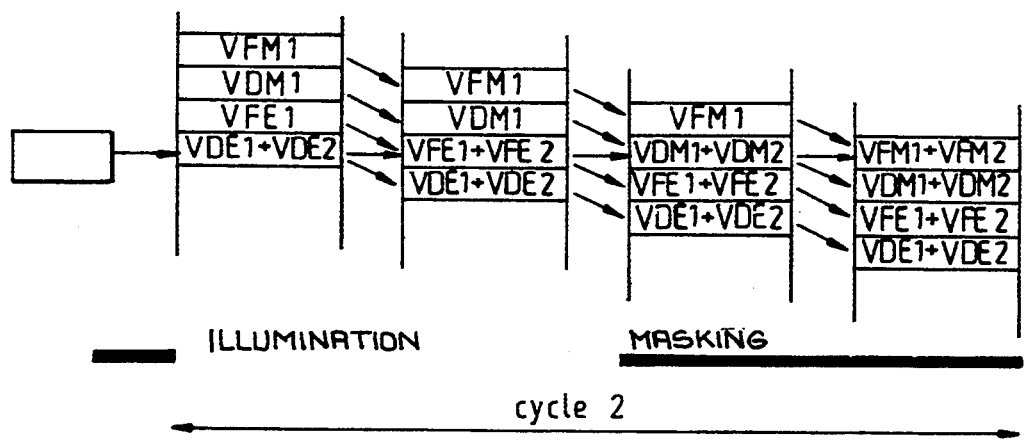

The charges shed at each measurement get added to the previous contents of the compartment of the register facing the injection device. The result thereof is that the measurements of the phases which correspond to each other in the two cycles get added to each other. The evolution of the contents is shown in FIG. 8.

The steps of moving backward (FIG. 7) and measurement (FIG. 8) can then be repeated several times to add up several successive measurements before emptying the register to obtain an image signal.

In general, the duration of a complete illumination/masking cycle is used to empty the register without making measurements. However, if the duration of an illumination (or masking) phase were to remain sufficient for there to be time to empty the register between the measurement of the start of the illumination and the measurement of the end of the illumination, it is possible to empty the register without interrupting the measurement cycles. It is then necessary to adopt a structure of cycles such as the one described with reference to FIG. 6 (end of a cycle immediately after the start of an illumination and masking phase).

The signals collected after the emptying of the register are used to set up a differential signal representing the temperature variations during the phases of illumination (VFE1+VFE2)-(VDE1+VDE2), a differential signal representing the temperature variations during the masking phases (VFM1+VFM2)-(VDM1+VDM2); and a result signal representing the difference between the differential signals: (VFE1+VFE2+VDM1+VDM2)-(VDE1+VDE2+VFM1+VFM2)

This signal represents the infrared intensity emitted by a pixel, averaged over two consecutive cycles.

What is claimed is:

1. A thermal image detector comprising:
    at least one column of pyrosensitive points, each point connected to a respective stage of a shift register in order to shed therein charges whose quantity depends on the temperature of each point;
    a shutter to illuminate and mask the thermal image detector alternately;
    a means to provide the register cyclically with at least one measurement signal of a point illuminated during an illumination phase and at least one measurement signal of a point masked during a masking phase;
    means for making the contents of the register go forward between the measurement shedding operations of a cycle including at least one illumination phase and one masking phase;
    means for making the contents of the register go backward before the measurement shedding operations of the next cycle and for making these contents go forward again between the shedding operations of this following cycle; and
    means for emptying the register after the performance of a group of at least two successive cycles to give an image signal.

2. A method for operating a thermal image detector having at least one column of pyrosensitive points, each point connected to a respective stage of a shift register in order to shed therein charges whose quantity depends on the temperature of each point, a shutter to illuminate and mask the detector alternately, a means to provide the register cyclically with at least one measurement signal of a point illuminated during an illumination phase and at least one measurement signal of a point masked during a masking phase, comprising the steps of:

a) making measurements during a first cycle including an alternation of illumination and masking phases, and shedding the results of the measurements into successive stages of a shift register, in making the register go forward by one step after a shedding and before the shedding of a following measurement of this cycle;

b) making the contents of the register go backward by a number of steps related to the number of forward steps in the cycle;

c) making measurements during a second cycle comprising an alternation of illumination and masking phases, shedding the results of the measurements into the stages of the shift register in making the shift register go forward again by one step after a shedding and before the next shedding in the same cycle;

d) and, finally, emptying all the contents of the register to give an image signal after the performance of at least two successive cycles.

3. A detector according to claim 2, wherein the steps b and c are repeated more than two times before step d is executed.

4. A detector according to claim 2 wherein, firstly, a start-of-phase measurement and, secondly, an end of phase measurement are shed into two compartments of the register.

5. A detector according to claim 4, wherein a step for the resetting to level of potential is carried out in synchronism with the changes in phase of the shutter, before each start-of-phase measurement.

* * * * *